Jan 6, 1931.  E. W. WOLF  1,787,850
BATTERY CHARGING UNIT
Filed March 6, 1929  3 Sheets-Sheet 2
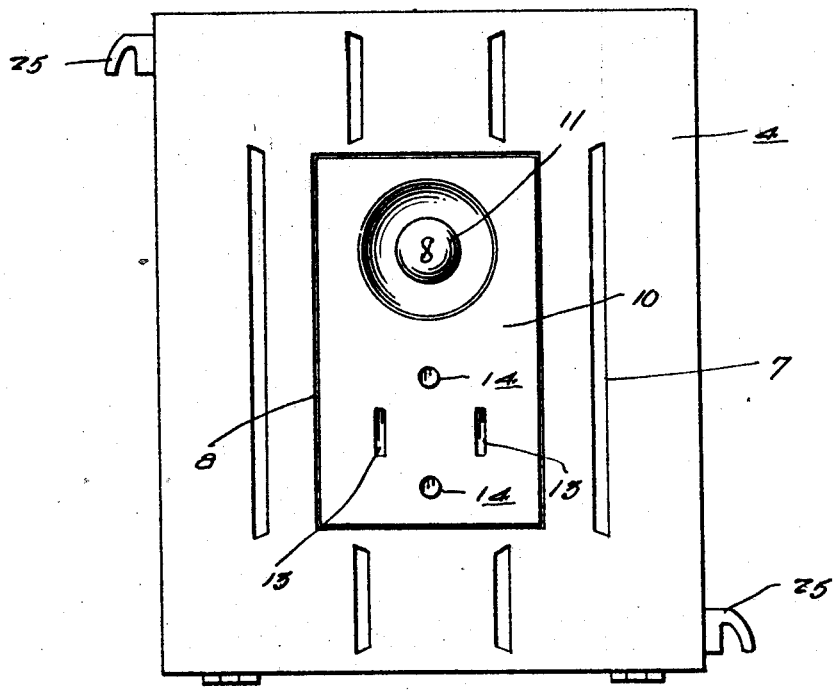
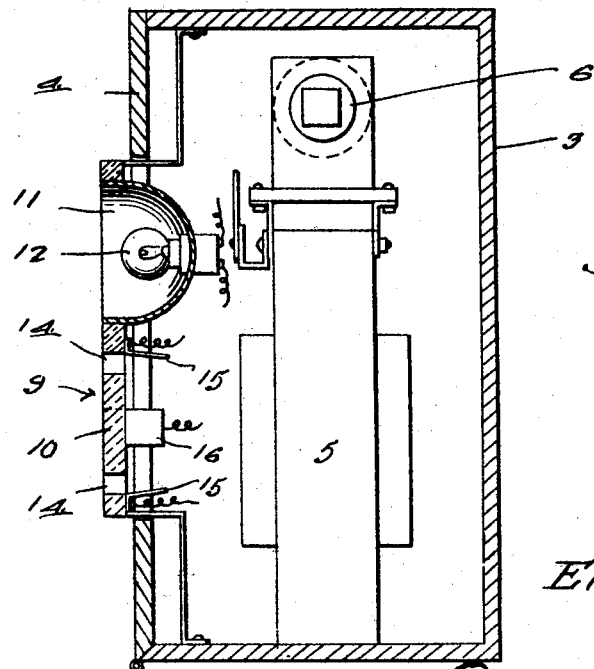
Inventor
Elmer W. Wolf
By Clarence A. O'Brien
Attorney Jan. 6, 1931.  E. W. WOLF  1,787,850
BATTERY CHARGING UNIT
Filed March 6, 1929   3 Sheets-Sheet 3
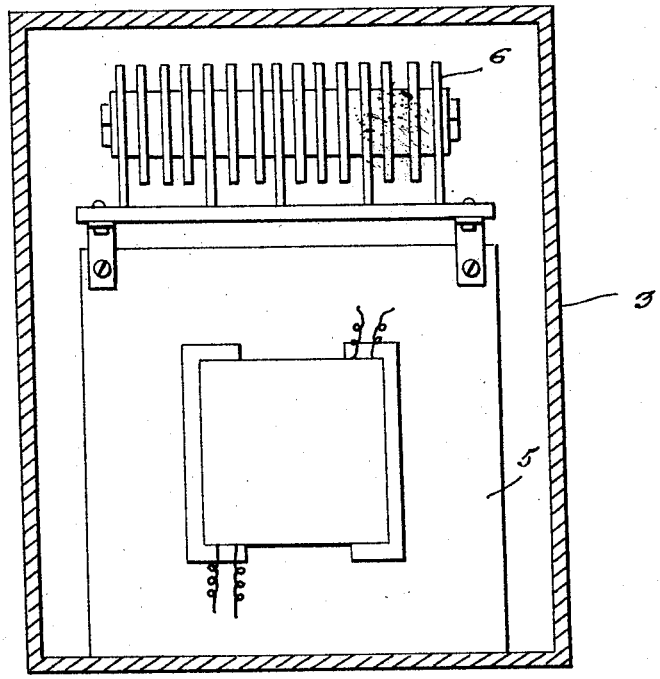
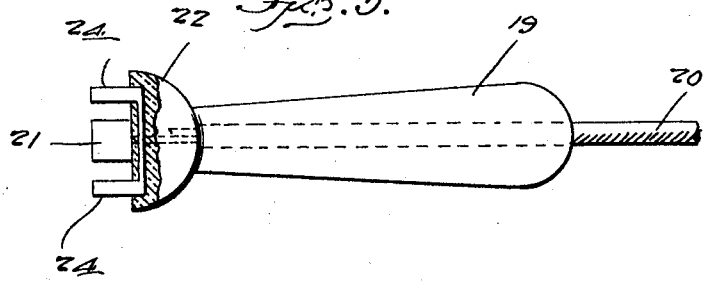
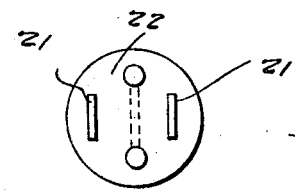
Inventor
*Elmer W. Wolf*
By *Clarence A. O'Brien*
Attorney Patented Jan. 6, 1931

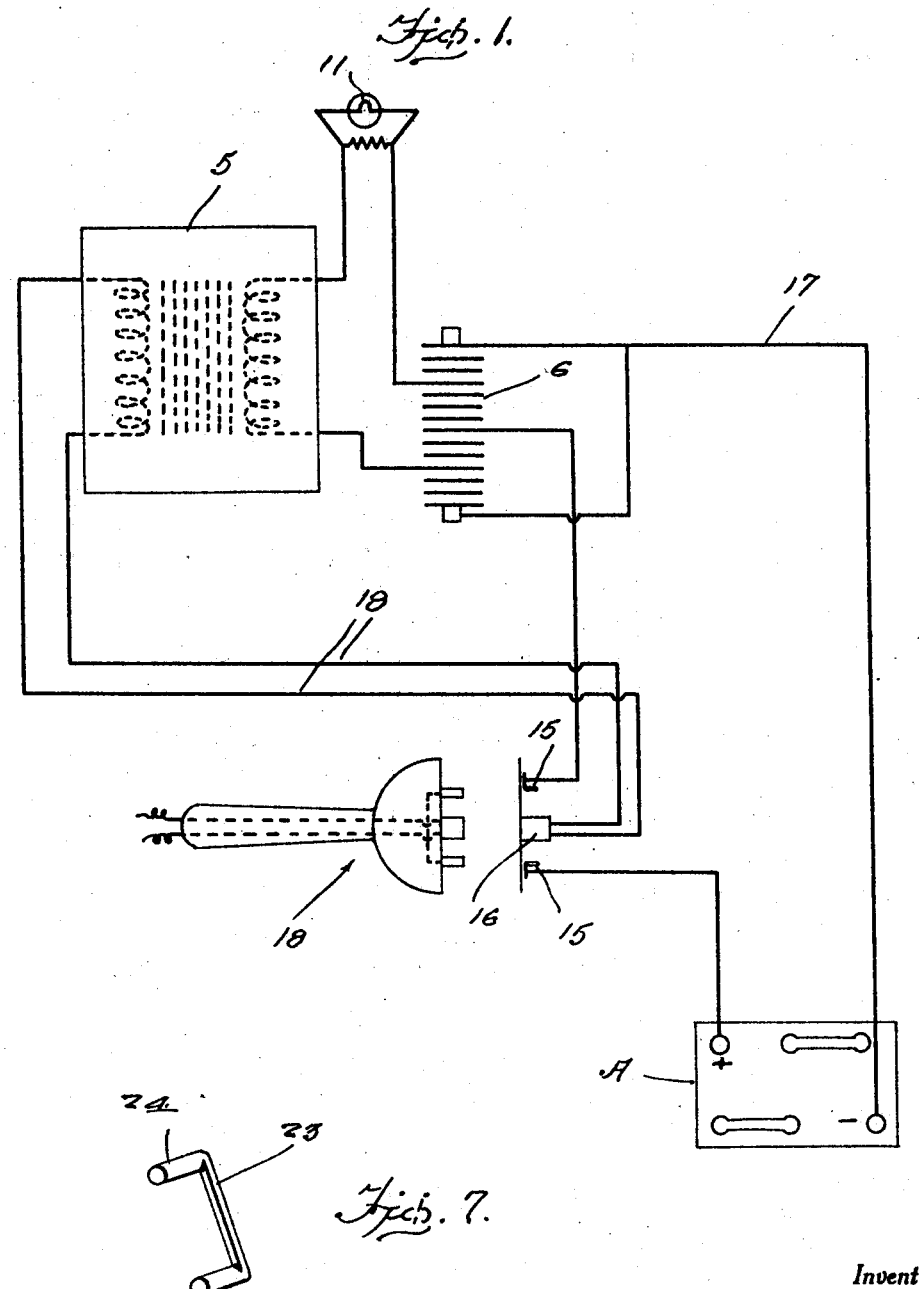

1,787,850

UNITED STATES PATENT OFFICE

ELMER W. WOLF, OF CLEVELAND, OHIO

BATTERY-CHARGING UNIT

Application filed March 6, 1929. Serial No. 344,757.

The present invention relates to improvements in battery chargers and more particularly to a charging unit for permanent installation on automobiles, aeroplanes, and like vehicles.

The principal object of this invention is to provide a charging unit for permanent residence on a vehicle so that a person may readily charge the battery thereon without necessarily removing the battery from its supported normal position.

Another object of the invention is to provide a charging unit which will permit the recharging of the battery while the vehicle is idle within a garage, especially overnight, in a safe and efficient manner without causing any inconvenience to the person attending the vehicle.

These and other objects of the invention will become more apparent to the reader after considering the invention as described and claimed hereinafter.

In the drawings:

Figure 1 represents a diagrammatic view showing the electrical connection between the various instruments involved in the present invention.

Figure 2 is a front elevation of the improved unit.

Figure 3 is a vertical sectional view through the unit.

Figure 4 is a vertical section through the unit taken at right angles to the sectional view of Figure 3.

Figure 5 is a side elevation in partial section of the novel plug employed in the present invention.

Figure 6 is an end elevation of the plug.

Figure 7 is a perspective view of a detail of the plug.

Referring to the drawings wherein like numerals designate like parts, the invention includes a housing 3 which may be suitably mounted within an automoble or aeroplane and has a hingedly mounted front wall 4. Mounted within the housing 3 is a suitable step-down transformer 5 and a rectifier 6, preferably of the dry type. The front wall of the housing is provided with a suitable number of vent slits 7 and an enlarged rectangular shaped opening 8 within which is mounted the novel electrical receptacle generally referred to by the numeral 9. This receptacle includes a plate 10 of suitable insulating material and is formed at its upper portion with a circular opening to receive the reflector 11 which carries a socket for receiving a bulb 12. The bulb is interposed between the secondary of the transformer 5 and the rectifier 6 in the manner shown in Figure 1. The plate 10 is provided at its lower portion with a pair of spaced parallel slots 13—13 which extend completely through the plate, and a narrow circular opening 14—14 arranged in vertical spaced relation. Secured to the inner side of the plate 10 are spring contacts 15 for the opening 14 and spring contacts 16 for the slots 13, the contacts being disposed partially across the path of said openings.

One of the contacts 15 is connected to the positive side of the storage battery A, while the other contact 15 is connected to the intermediate point of the rectifier 6, in the manner shown in Figure 1. The opposite ends of the rectifier 6 are connected by the conductor 17 to the negative side of the battery A. The contacts 16 have conductors 18 forming opposite sides of the primary circuit of the transformer 5.

In glancing at the diagrammatic view of Figure 5, there it will be seen that there can be no discharge of the battery through the transformer and rectifier when the battery is not undergoing recharging, due to the break between the contacts 15—15. In order to bridge the contacts 15—15 a special plug is employed and generally referred to by the numeral 18 in Figure 1, this block consists of a handle 19 through which the cord 20 is disposed, the conductors of the cable being connected to the legs 21—21 projecting from the enlarged head 22 at one end of the handle 19. The blades 21—21 are adapted for insertion through the slots 13—13 and for contact with the contacts 16. The head 22 of the plug also carries an U-shaped member as shown in Figure 7. This U-shaped member is of conductive material and has its bight portion 23 embedded within the head 22, so that the cylindrical leg portion 24 will project beyond the face of the head 22 in substantially the manner shown in Figure 5. The legs 24 are adapted for insertion within the openings 14—14 of the receptacle and for contact with the spring contact members 15—15, so that these contacts 15—15 will be bridged during the time the battery is undergoing recharging.

Obviously the plug has a special cooperative relation to the receptacle 9 to obtain the result aforementioned. Suitable members 25 may be provided on the housing 3 to permit the support of the housing at a suitable point within the vehicle. It is to be understood that certain changes in the specific shape, size and materials may be resorted to in the construction of this novel charging unit without departing from the spirit and scope of the invention as claimed hereinafter.

Having thus described the invention, what I claim as new and desire to secure by Letters Patent is:—

1. A battery charging unit for vehicles comprising in combination, a current rectifier, a transformer, a housing for said rectifier and transformer, said transformer and rectifier being electrically connected together, a connection between the battery and the rectifier, an electrical receptacle in connection with said transformer for receiving an energy supply, said receptacle consisting in construction of two pairs of contacts, one contact of one pair being connected to one side of the battery, while the other contact is connected to one side of the rectifier, the other pair of contacts being spaced and connected across the primary of the transformer, the secondary of the transformer being connected to the rectifier, and a connection from the rectifier to the opposite side of the battery, and means whereby the first mentioned contacts may be bridged while energy is flowing through the primary of the transformer.

2. A battery charging unit for vehicles comprising in combination, a current rectifier, a transformer, a housing for said rectifier and transformer, said transformer and rectifier being electrically connected together, a connection between the battery and the rectifier, an electrical receptacle in connection with said transformer for receiving an energy supply, said receptacle consisting in construction of two pairs of contacts, one contact of one pair being connected to one side of the battery, while the other contact is connected to one side of the rectifier, the other pair of contacts being spaced and connected across the primary of the transformer, the secondary of the transformer being connected to the rectifier, a connection from the rectifier to the opposite side of the battery, means whereby the first mentioned contacts may be bridged while energy is flowing through the primary of the transformer, said means consisting of a plug provided with two pairs of blades for engagement with said contacts, an energy supply line connected to a pair of the blades, the other pair of blades being interconnected to provide a bridge for the last mentioned contacts.

In testimony whereof I affix my signature.

ELMER W. WOLF.